No. 679,676. Patented July 30, 1901.
L. M. HOSEA.
BRAKE FOR SINGLE TRACK RAILWAYS.
(Application filed Feb. 21, 1901.)
(No Model.)
Fig. 1.
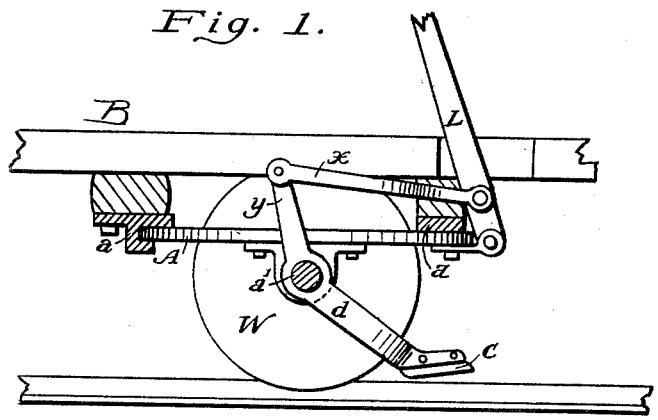
Fig. 2. Fig. 3. Fig. 4.
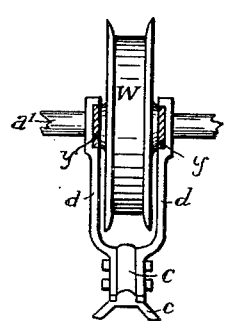 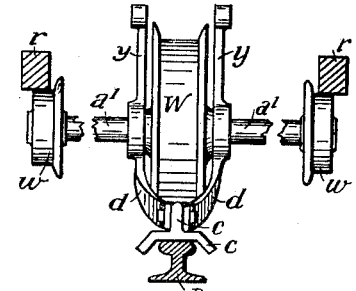 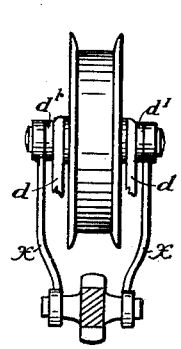
Fig. 5.
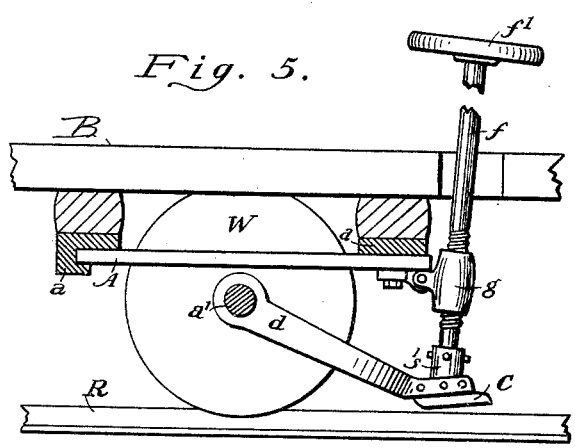
Fig. 6.
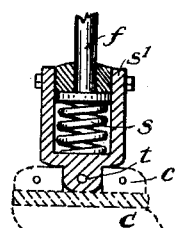
Witnesses.
Walter A. Knight
Kate E. Bodine
Inventor.
Lewis M. Hosea

UNITED STATES PATENT OFFICE.

LEWIS M. HOSEA, OF CINCINNATI, OHIO, ASSIGNOR, BY MESNE ASSIGNMENTS, TO CRAWLEY SCENIC AND PLEASURE RAILWAY COMPANY, OF SAME PLACE.

BRAKE FOR SINGLE-TRACK RAILWAYS.

SPECIFICATION forming part of Letters Patent No. 679,676, dated July 30, 1901.

Application filed February 21, 1901. Serial No. 48,223. (No model.)

*To all whom it may concern:*

Be it known that I, LEWIS M. HOSEA, a citizen of the United States, residing at Cincinnati, in the county of Hamilton and State of Ohio, have invented new and useful Improvements in Brakes for Single-Track Railways, of which the following is a specification.

My invention has relation to single-track railways wherein guard-rails are employed with suitable guard-wheels upon the car or its running-gear to maintain the equilibrium of the car and prevent derailment, its object being to provide a suitable brake adapted to control the speed and movement of the car under all circumstances of use, thereby facilitating the proper use and enhancing the safety of such service.

To this end my invention consists in a trailing brake adapted when in use to bear downward against the main bearing-rail with adjustable force in frictional contact, and thus retard or stop the motion of the car without possibility of locking or "skidding" the bearing or guard wheels, and also is the means of operating said brake whereby said operation is brought conveniently within reach of the operator for instant and effective use.

My invention is illustrated in the accompanying drawings, in which—

Figure 1 is a side elevation of the brake and its immediate connections, showing a hand-lever employed as the means of operation; Figs. 2 and 3, a plan view and a rear elevation, respectively, of the bearing-wheel of the truck or car, showing the construction and mode of attachment of the trailing brake and in Fig. 3 showing the relation of the guard-rails and wheels thereto; Fig. 4, a plan view showing the hand-lever and connection thence to the bell-crank lever for operating the brake-shoe. Fig. 5 is a side elevation of the brake, showing a screw-shaft applied as the means of operating the same; and Fig. 6 a detail showing the attachment of the screw-shaft to the brake-shoe with provision for an interposed spring.

Referring now to the drawings in and of the subjoined description, it should be premised that the illustrations show the brake applied to a form of running-gear in which a bearing-wheel is attached to the car B through the medium of a swiveling truck A, but that the brake apparatus hereinafter described is not limited in its application to this structure, but is equally applicable to those in which the bearing-wheel is made a direct and integral part of the car-body or to a two-wheel truck in which the wheels are arranged tandem.

The truck A shown in the present case is annular and arranged to swivel in bearings $a$ upon the frame of the car, like the "fifth-wheel" of a wagon in order that the wheels may be adjusted to the radii of curvature of the track by means not necessary to illustrate here.

The brake itself is a shoe $c$, preferably of cast metal, attached to and between the termini of two trailing arms $d\ d$, hung upon the axle-bar $a'$ of the bearing-wheel W at either side of said wheel. In the illustrations the shoe $c$ is formed with a dorsal flange C, to and through which the arms $d$ are bolted.

Two modes of operating the shoe upon the track are shown. In Figs. 1, 2, 3, and 4 the arms $d$ are extended by extensions $y$, the portions $d\ y$ constituting a bell-crank lever pivoted upon the axle $a'$, to the upper extremity of which bell-cranks are articulated two connecting-rods $x$, extending and attached to a hand-lever L, pivoted upon the swiveling truck A.

In the class of railways to which the invention is applied the truck or car is provided with laterally-projecting studs upon which are pivoted wheels $w$, operating beneath guide-rails $r$, arranged at the sides of the central track-rail R. In the illustrations the guard-wheels $w$ are carried at the outer termini of the axle $a'$ and the guide-rails $r$ arranged correspondingly.

It will be seen that on operating the lever L, Fig. 1, to the right or backward the bell-crank lever $d\ d'$ presses the brake-shoe C downward upon the track R. Under ordinary conditions the force applicable would be limited by the weight of the car; but in the present case the force applicable is not so limited, since any tendency to lift the car from the bearing-rail R is directly resisted by upward contact of the guard-wheels $w$ with the guard-rails $r$.

In Fig. 5 in lieu of the lever L and the bell-crank extensions $d'$ and connections $x$, above described, I substitute a screw-shaft $f$, operating through a screw-socket $g$, attached to the truck A and bearing against the shoe C. I may also employ a spring-buffer $s$, interposed between the end of the screw-shaft $f$ and the brake-shoe C. A practicable construction of this is shown in Fig. 6, in which a spring-casing $s'$ is employed, having at the bottom a tongue $t$, projecting downward between the arms $d$ and pivotally connected therewith in an opening or central recess in the dorsal flange $c$, which is likewise bolted to the arms $d$. The pivotal connection of the spring-casing $s'$ with the shoe and a pivotal connection of the screw-socket $g$ with the swiveling truck A permit the shaft $f$ to accommodate itself to the slight change of position, due to the arc of movement of the brake-shoe C, held by its pivotal trailing arms $d$ $d$.

I claim as my invention and desire to secure by Letters Patent of the United States—

1. In a single-rail railway system having guard-wheels bearing upwardly against guard-rails, a track-brake consisting essentially of a shoe attached to trailing arms pivoted to the truck or car body, adapted to trail behind the wheels and means connected with the car or truck operating to force the shoe into frictional contact with the bearing-track, substantially as set forth.

2. In combination with a wheel-truck, a bell-crank lever pivotally carried upon the wheel-axle or extensions thereof, so that one arm of the lever trails behind the wheel; a shoe attached to the rear terminal of said lever, and a hand-lever pivoted upon the truck or car in connection with the opposite terminal of the bell-crank by the operation of which the shoe is forced into frictional contact with the main bearing-rail, substantially as set forth.

3. In a track-brake of the character indicated, the combination of a hand-lever pivoted to the swiveling-truck frame, two straps or connecting braces pivoted to the same at opposite sides, two bell-crank levers upon the wheel-shaft at opposite sides of the bearing-wheel with upper arms projecting upwardly and connecting with the aforesaid straps; and lower arms projecting rearwardly beyond the wheel, and a brake-shoe adapted to the contour of the track, carried by and between the rear terminals of the bell-crank lever, substantially as set forth.

In testimony whereof I have hereunto set my hand in presence of two subscribing witnesses.

LEWIS M. HOSEA.

Witnesses:
WALTER A. KNIGHT,
KATE E. BODINE.